US006801976B2

(12) United States Patent
Creta et al.

(10) Patent No.: US 6,801,976 B2
(45) Date of Patent: Oct. 5, 2004

(54) MECHANISM FOR PRESERVING PRODUCER-CONSUMER ORDERING ACROSS AN UNORDERED INTERFACE

(75) Inventors: Kenneth C. Creta, Gig Harbor, WA (US); Bradford B. Congdon, Olympia, WA (US); Tony S Rand, Tacoma, WA (US); Deepak Ramachandran, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 09/940,292

(22) Filed: Aug. 27, 2001

(65) Prior Publication Data

US 2003/0041185 A1 Feb. 27, 2003

(51) Int. Cl.[7] ............................................... G06F 13/00
(52) U.S. Cl. .......................... 710/310; 710/39; 710/313
(58) Field of Search ........................... 710/6, 7, 29, 36, 710/39, 52, 306, 310, 311, 313

(56) References Cited

U.S. PATENT DOCUMENTS

| | | | |
|---|---|---|---|
| 5,546,546 A | | 8/1996 | Bell et al. |
| 6,021,451 A | * | 2/2000 | Bell et al. .................... 710/309 |
| 6,047,120 A | | 4/2000 | Bell |
| 6,134,619 A | | 10/2000 | Futral et al. ................. 710/112 |
| 6,219,737 B1 | | 4/2001 | Chen et al. |
| 6,243,781 B1 | | 6/2001 | Gandhi et al. |

FOREIGN PATENT DOCUMENTS

EP          0 747 831 A2      12/1996

OTHER PUBLICATIONS

Antony Cataldo: "Intel Prepares For Server Chip Set Revival"; EETIMES, SoC Online, Aug. 23, 2001, pp. 1–3, XP–002218251; retrieved from the Internet: URL:http://www.eetimes.com/story/OEG20010 retrieved on Oct. 25, 2002, p. 1–p. 2.

PCI Special Interest Group, *PCI Local Bus Specification—Production Version, Revision 2.1*, Portland, Oregon, ©Jun. 1, 1995.

* cited by examiner

*Primary Examiner*—Glenn A. Auve
(74) *Attorney, Agent, or Firm*—Pillsbury Winthrop LLP

(57) ABSTRACT

An input/output hub includes an inbound ordering queue (IOQ) to receive inbound transactions. All read and write transactions have a transaction completion. Peer-to-peer transactions are not permitted to reach a destination until after all prior writes in the IOQ have been completed. A write in a peer-to-peer transaction does not permit subsequent accesses to proceed until the write is guaranteed to be in an ordered domain of the destination. An IOQ read bypass buffer is provided to receive read transactions pushed from the IOQ to permit posted writes and read/write completions to progress through the IOQ. An outbound ordering queue (OOQ) stores outbound transactions and completions of the inbound transactions. The OOQ also issues write completions for posted writes. An OOQ read bypass buffer is provided to receive read transactions pushed from the OOQ to permit posted writes and read/write completions to progress through the OOQ. An unordered domain within the input/output hub receives the inbound transactions transmitted from the IOQ and receives the outbound transactions transmitted from an unordered protocol.

22 Claims, 4 Drawing Sheets

MECHANISM FOR PRESERVING PRODUCER-CONSUMER ORDERING ACROSS AN UNORDERED INTERFACE

BACKGROUND OF THE INVENTION

1. Field of the Invention

The present invention generally relates to an input/output (I/O) hub. More particularly, the present invention relates to an I/O hub that is adapted to implement Producer-Consumer (P/C) ordering rules across an interface that is inherently unordered in a multi-processor computer system architecture.

2. Discussion of the Related Art

Multi-processor computer systems are designed to accommodate a number of central processing units (CPUs), coupled via a common system bus or switch to a memory and a number of external input/output devices. The purpose of providing multiple central processing units is to increase the performance of operations by sharing tasks between the processors. Such an arrangement allows the computer to simultaneously support a number of different applications while supporting I/O components that are, for example, communicating over a network and displaying images on attached display devices. Multi-processor computer systems are typically utilized for enterprise and network server systems.

An input/output hub may be provided as a connection point between various input/output bridge components, to which input/output components are attached, and ultimately to the central processing units. Many input/output components are Peripheral Component Interconnect (PCI) ("PCI Local Bus Specification, Revision 2.1, Jun. 1, 1995, from the PCI Special Interest Group (PCI-SIG)) devices and software drivers that adhere to the PCI Producer-Consumer (P/C) model and its ordering rules and requirements. ("PCI Local Bus Specification", Revision 2.1, Appendix E, "System Transaction Ordering".) For example, these ordering rules allow writes to be posted for higher performance while ensuring "correctness". Posting means that the transaction is captured by an intermediate agent, e.g., a bridge from one bus to another, so that the transaction completes at the source before it actually completes at the intended destination. Posting allows the source to proceed with the next operation while the transaction is still making its way through the system to its ultimate destination. In other words, write posting in a PCI device means that the writes that are issued are not expected to return a "complete" response. That is, when posted writes are issued, there is no confirmation returned indicating that the write is completed. The term "correctness" implies that a flag or semaphore may be utilized to guard a data buffer between a Producer-Consumer pair.

Coherent interfaces interconnecting the I/O hub and, ultimately, to the processors, are inherently unordered. Therefore, ordering rules under the P/C model are more restrictive than those for a coherent interface, which may have no ordering rules at all. Coherent interfaces, such as a front-side bus or an Intel Scalability Port, are inherently unordered because the processors for which the coherent interface was designed are complex devices. These processors have the intelligence to distinguish when ordering is required and when it is not. Therefore, in general, coherent interfaces can treat completions independently of requests (in either direction). PCI devices, however, are generally not this complex and are more cost-sensitive, and therefore rely on the system ordering rules to avoid deadlocks. PCI ordering rules do allow some flexibility in relaxing the ordering requirements of specific transactions, though.

It is particularly beneficial to retain the use of PCI devices and devices that follow the P/C ordering model, as they are generally designed toward cost-sensitivity. Accordingly, what is needed is a cost-effective optimized chipset implementation that bridges an ordered domain (one which requires PCI ordering and follows the P/C ordering model) and an unordered domain, such as a coherent interface in connection with a plurality of processor units, without any additional software or hardware intervention. Because a PCI device is generally designed towards cost-sensitivity and may not exploit the relaxations in the PCI ordering rules, there is a need for a system that can exploit the performance optimizations allowed with the PCI ordering rules by employing all of the ordering relaxation capabilities on behalf of these devices, while at the same time avoiding any deadlock vulnerabilities and performance penalties.

DETAILED DESCRIPTION

Figure 1:
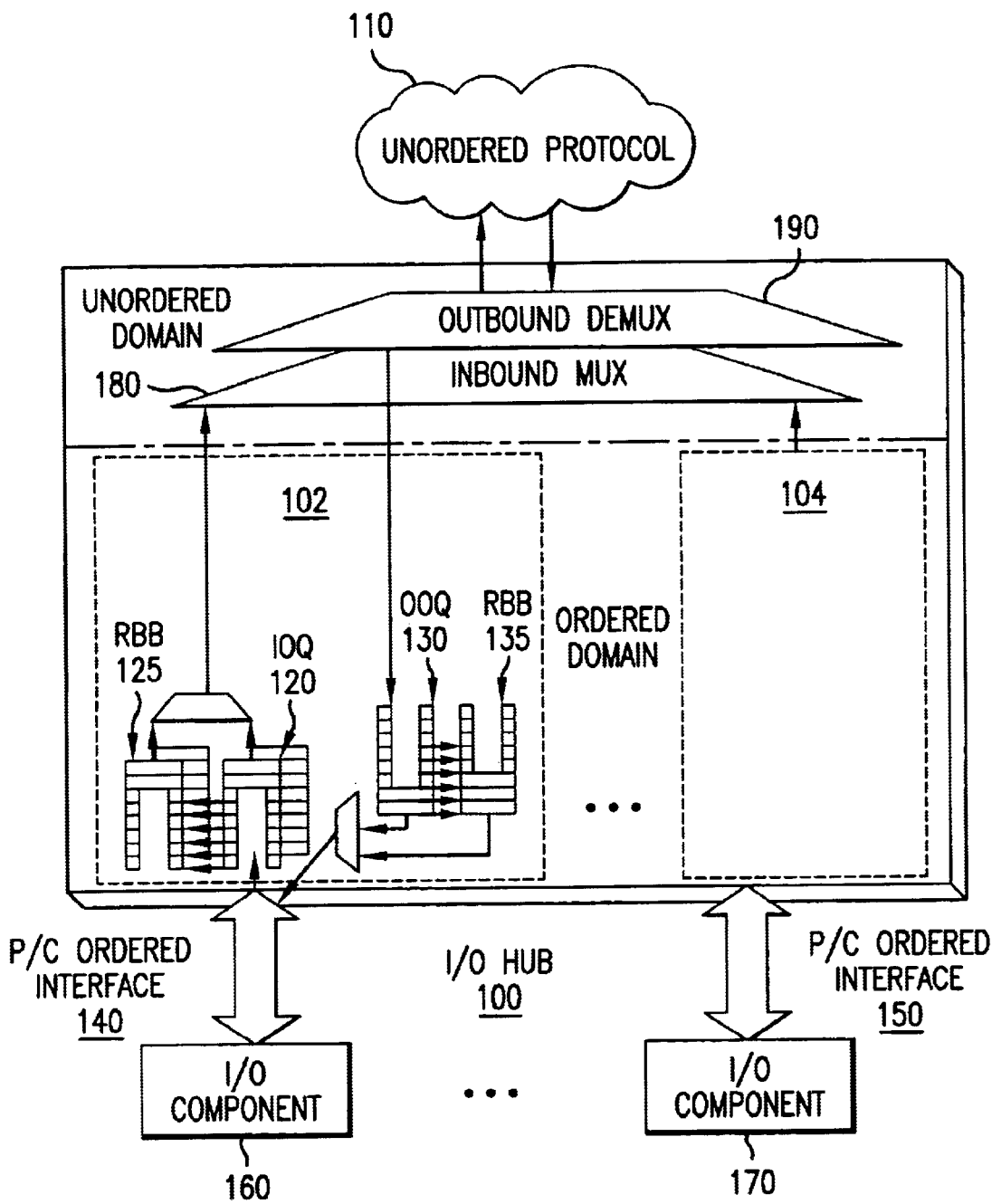
FIG. 1 illustrates an input/output hub according to an embodiment of the present invention.

FIG. 1 illustrates an input/output hub according to an embodiment of the present invention. The I/O hub 100 includes an ordered domain and an unordered domain. Within the ordered domain, one or more functional blocks 102, 104 facilitate the inbound and outbound transactions between the I/O component(s) 160, 170 and the unordered protocol 110. Each functional block 102, 104 includes an inbound ordering queue (IOQ) 120, an IOQ read bypass buffer (RBB) 125, an outbound ordering queue (OOQ) 130, and an OOQ read bypass buffer (RBB) 135.

Within the unordered domain, an inbound multiplexer 180 receives data and signals from the functional block(s) 102, 104 of the ordered domain (and more specifically, from the IOQ 120 and the IOQ RBB 125). An outbound demultiplexer 190 within the unordered domain receives data and signals from the unordered protocol 110, such as a coherent interface like the Scalability Port, for transmission to the ordered domain (and more specifically, to the OOQ 130 of the functional block(s) 102, 104).

At least one P/C ordered input/output interface 140, 150 is provided to connect with the input/output devices or components 160, 170, such as PCI devices. The P/C ordered interface 140, 150 typically does not directly connect with the I/O devices or components 160, 170, though. An intermediary device, such as a hub-link or input/output bridge, like an Intel P64H2 Hub Interface-to-PCI Bridge, or a VXB InfiniBand ("InfiniBand Architecture Specification", version 1.0, Jun. 19, 2001, from the InfiniBand Trade Association) Bridge, is generally connected to the P/C ordered interface 140, 150, to which the I/O devices or components 160, 170 connect. Each P64H2 bridge, for example, has two PCI-X ("PCI-X Specification", Revision 1.0a, Aug. 29, 2000, from the PCI-SIG) segments to which I/O devices or components 160, 170 may connect. PCI-X is a high-performance extension to the PCI local bus having increased bandwidth and bus performance.

The I/O hub 100 according to an embodiment of the present invention is "cut" into two domains: an ordered domain and an unordered domain. The ordered domain adheres to the Producer-Consumer ordering rules described in the PCI specification and may be designed in many different ways. The unordered domain has no ordering rules. By implementing the I/O hub 100 according to the layered approach of the present invention, Producer-Consumer ordering across an unordered interface may be preserved.

Inbound ordering queues (IOQs) 120 are responsible for enqueuing inbound read and write transactions/requests targeting the main memory or a peer I/O component. The IOQ 120 is preferably configured in a first-in-first-out (FIFO) manner enforcing that inbound read and write transactions/requests are not allowed to bypass inbound writes (i.e., write data). Moreover, outbound read and write completions (data returning for reads targeting an I/O component) are also enqueued in the IOQ 120, along with any other outbound special cycles. Utilizing this configuration, Producer-Consumer "correctness" may be ensured.

Under the PCI ordering rules, posted writes are permitted. However, in the unordered domain, posted write transactions are not allowed. Accordingly, both read and write transactions require a transaction completion. Therefore, writes in the IOQ 120 are issued to the unordered domain and are not deallocated until the unordered interface returns a completion (to the OOQ 130).

When a peer-to-peer transaction is issued, it is not permitted to the destination interface (either on the same I/O hub or a different I/O hub) until after all prior writes in the IOQ 120 have been completed. This restriction ensures proper ordering when the data and semaphore are located in different destinations, e.g., the first write is data to the main memory and the peer-to-peer write is for a semaphore on the peer I/O component.

With respect to peer-to-peer write transactions that flow between two I/O hubs, there is some time where the posted write flows through the unordered fabric before reaching the ordered domain in the destination I/O hub. Therefore, the write (even though it is peer-to-peer and targets the ordered domain) must not allow subsequent accesses to proceed until the peer write is guaranteed to be in the ordered domain of the destination. This requirement ensures "completion" for the posted write.

The number of IOQs 120 implemented depends on the number of independent data streams for which the I/O hub is optimized. At a minimum, one queue per port will provide correct behavior, but one queue per independent stream would relax the ordering constraints between independent data streams on that port.

The outbound ordering queues (OOQs) 130, along with the OOQ read bypass buffer (RBB) 135, maintain Producer-Consumer ordering by holding both outbound transactions (e.g., read and write requests) as well as completions for inbound transactions. As stated before, according to an embodiment of the present invention, the unordered domain requires completions even for write transactions. The I/O hub 100 is responsible for posting these outbound writes for optimal performance in the ordered domain and does so by issuing a completion response (from the OOQ 130) for the write only after it has reached the OOQ 130. The completion is issued upon entry to the OOQ 130, and therefore latency is faster because the completion is returned earlier as compared to returning it after it reaches the P/C ordered interface 140, 150. Similarly, reads could theoretically fill up the OOQ 130. In order to prevent this "back pressure" from flowing into the unordered domain (which could prevent write forward-progress), read transactions are pushed into the RBB 135 and then are retried at the ordered domain boundary line when permissible.

The IOQ 120 and the OOQ 130 each have at least one corresponding read bypass buffer (RBB) 125, 135, respectively. The read bypass buffers 125, 135 allow posted writes and read/write completions to make progress past stalled read requests waiting for their completions to return. They apply to both inbound and outbound traffic. That is, when a posted write or read/write completion needs to progress through the IOQ 120 or OOQ 130, the (stalled) read transactions/requests within the IOQ 120 or OOQ 130 are "pushed" aside into the respective RBBs 125, 135 so as to allow the posted write or read/write completion to progress through the IOQ 120 or OOQ 130. Then, the first "pushed aside" task in the queue of the RBB 125, 135 is attempted when the blocking condition causing the stall no longer exists. The read transactions within the RBBs 125, 135 and subsequent transactions within the IOQ 120 and OOQ 130 are then arbitrated to be completed. The read bypass buffers 125, 135 ensure deadlock free operation in the ordered domain.

According to an embodiment of the present invention, a functional block 102, 104 (which has an IOQ 120 and an OOQ 130) is provided with each P/C ordered interface 140, 150. Although the embodiment illustrated in FIG. 1 shows two functional blocks 102, 104 and a corresponding P/C ordered interface 140, 150 for each functional block 102, 140, any suitable configuration and numbers of functional blocks and P/C ordered interfaces may be utilized.

Figure 2A:
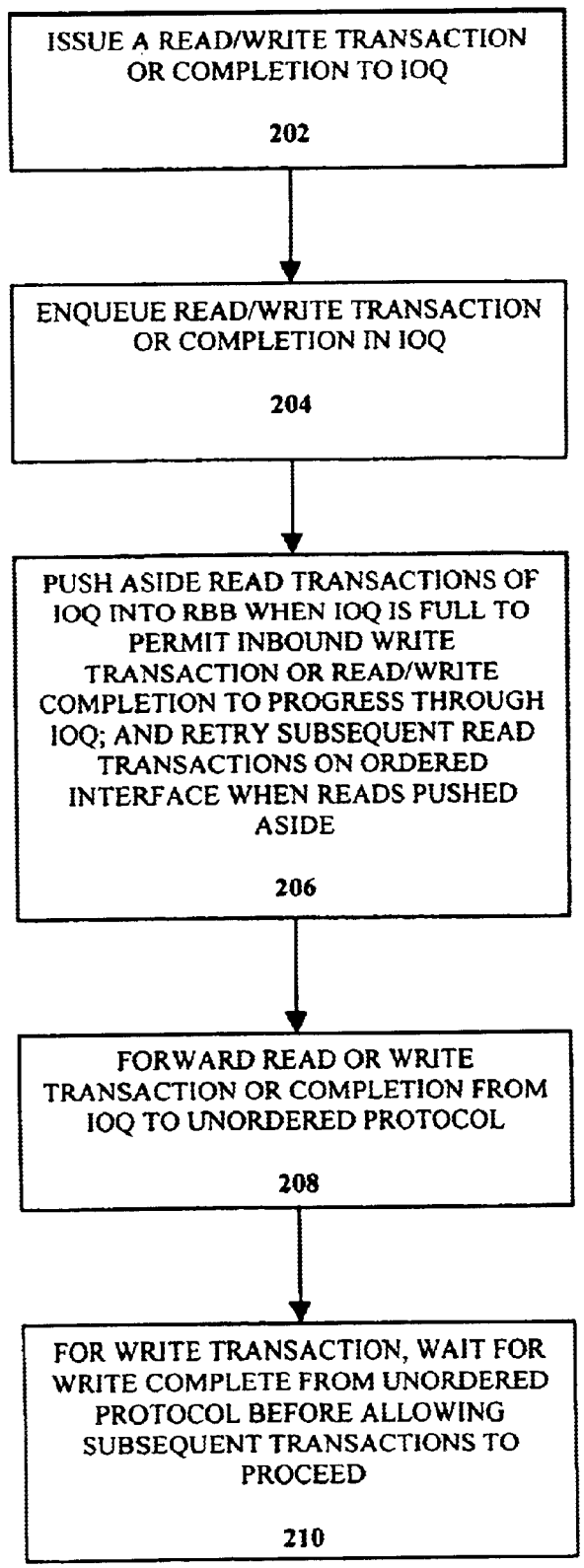
FIG. 2A illustrates an inbound transaction through an inbound ordering queue (IOQ) according to an embodiment of the present invention.

FIG. 2A illustrates an inbound transaction through an inbound ordering queue (IOQ) according to an embodiment of the present invention. The P/C ordered interface 140, 150 (by direction of the I/O component 160, 170) issues 202 a read or write transaction/request or completion to the IOQ 120 of the I/O hub 100. The read/write transaction or completion is enqueued 204 in the IOQ 120. When the IOQ 120 is full, read transactions in the IOQ 120 are pushed 206 aside into the IOQ read bypass buffer 125 so as to permit inbound write transaction(s) or read/write completion(s) to progress through the IOQ 120 and to the unordered protocol 110. When the reads are pushed aside, subsequent read transactions are retried on the ordered interface 140, 150. Otherwise, the read or write transactions or completions enqueued in the IOQ 120 are forwarded 208 to the unordered protocol 110, preferably in a first-in-first-out (FIFO) fashion. For write transactions, they must wait 210 for a completion from the unordered protocol 110 before allowing subsequent transactions to proceed. This scheme is utilized to maintain order within the system.

Figure 2B:
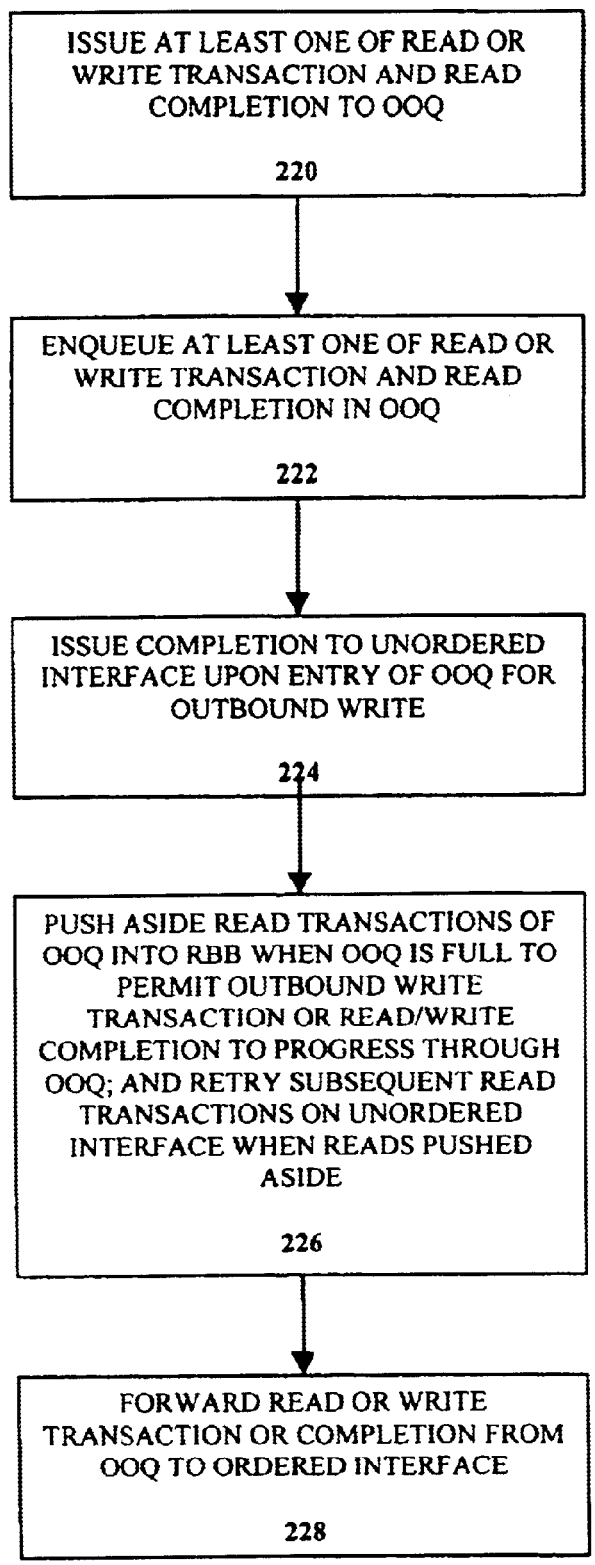
FIG. 2B illustrates an outbound transaction through an outbound ordering queue (OOQ) according to an embodiment of the present invention.

FIG. 2B illustrates an outbound transaction through an outbound ordering queue (OOQ) according to an embodiment of the present invention. At least one of a read or write transaction/request and a read completion are issued 220 from the unordered protocol 110, such as a coherent interface like a Scalability Port, to the OOQ 130 of the I/O hub 100. The at least one of the read or write transaction and the read completion are enqueued 222 in the OOQ 130. A completion is issued 224 to the unordered interface 110 for an outbound write upon entry into the OOQ 130. When the OOQ 130 is full, read transactions in the OOQ 130 are pushed 226 aside into the OOQ read bypass buffer 135 so as to permit inbound write transaction(s) or read/write completion(s) to progress through the OOQ 130 and to the P/C ordered interface 140, 150. When the reads are pushed aside, subsequent read transactions are retried on the unordered interface 110. Otherwise, the read or write transactions or completions enqueued in the OOQ 130 are forwarded 228 to the P/C ordered interface 140, 150, and ultimately to the I/O component 160, 170.

Figure 3:
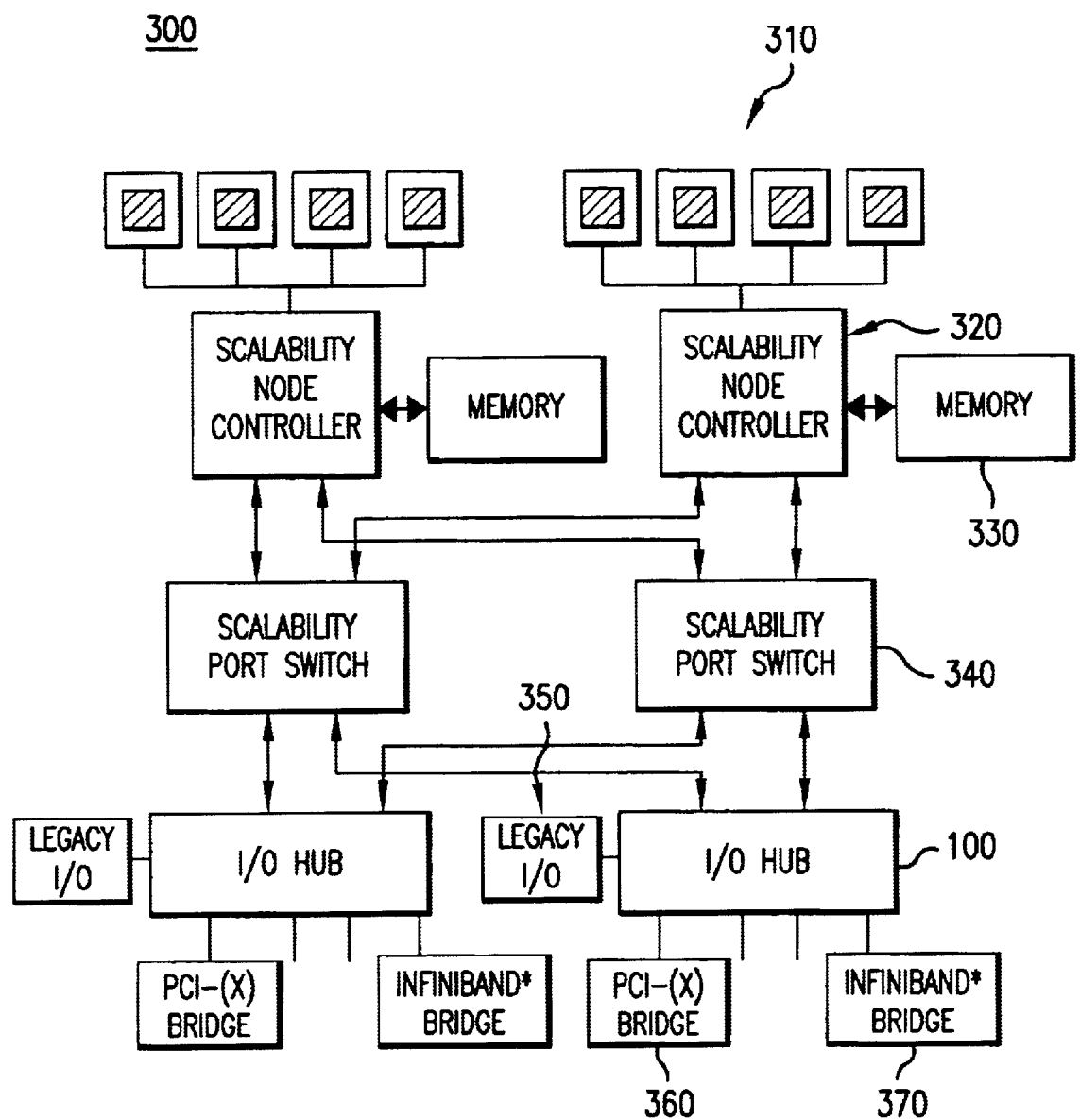
FIG. 3 illustrates an input/output system architecture according to an embodiment of the present invention.

FIG. 3 illustrates an input/output system architecture according to an embodiment of the present invention. As discussed above, the I/O hub 100 may include P/C ordered interfaces that are coupled to an intermediary device, such as a hub-link or input/output bridge, like a PCI-X bridge 360 or an InfiniBand bridge 370. The I/O components or devices 160, 170 (of FIG. 1) then connect to the intermediary devices 360, 370. The I/O hub 100 may also include an I/O interface that connects to a legacy input/output bridge 350 to handle connections with legacy I/O components or devices.

The I/O hub 100 is adapted to connect to a coherent interface, such as a Scalability Port 340, which is a cache-coherent interface optimized for scalable multi-node systems that maintain coherency between all processors and their caches. The Scalability Port 340 in turn may connect to at least one Scalability Node Controller 320, which controls the interface between the processors 310, the main memory 330, e.g., dynamic random access memory (DRAM), and the Scalability Port 340.

In summary, the I/O hub 100 according to the present invention permits retention of the use of PCI devices and devices that follow the P/C ordering model, which are generally designed towards cost-sensitivity. The I/O hub 100 provides a cost-effective optimized chipset implementation, such as in the Intel 870 chipset, that bridges an ordered domain (one which requires PCI ordering and follows the P/C ordering model) and an unordered domain, such as a coherent interface, without any additional software or hardware intervention. Because a PCI device is generally designed towards cost-sensitivity and may not exploit the relaxations in the PCI ordering rules, the I/O hub 100 of the present invention exploits the performance optimizations allowed with the PCI ordering rules by employing all of the ordering relaxation capabilities on behalf of these devices, while at the same time avoiding any deadlock vulnerabilities and performance penalties.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. An input/output hub, comprising:
   an inbound ordering queue (IOQ) to receive inbound transactions, wherein all read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;
   an IOQ read bypass buffer to receive read transactions pushed from the IOQ to permit posted writes and read/write completions to progress through the IOQ;
   an outbound ordering queue (OOQ) to store outbound transactions from an unordered protocol, wherein the unordered protocol is a coherent interface, and completions of the inbound transactions, and to issue a write completion for a posted write;
   an OOQ read bypass buffer to receive read transactions pushed from the OOQ to permit the posted writes and the read/write completions to progress through the OOQ; and
   an unordered domain to receive the inbound transactions transmitted from the IOQ and to receive the outbound transactions transmitted from the unordered protocol.

2. The input/output hub according to claim 1, wherein the IOQ does not permit the inbound read and write transactions to bypass inbound write data.

3. An input/output hub, comprising:
   an inbound ordering queue (IOQ) to receive inbound transactions, wherein all read and write transactions have a transaction completion, peer-to-peer transactions are not permitted to reach a destination until after all Prior writes in the IOQ have been completed, and a write in a peer-to-peer transaction does not permit subsequent accesses to proceed until the write is guaranteed to be in an ordered domain of the destination;
   an IOQ read bypass buffer to receive read transactions pushed from the IOQ to permit posted writes and read/write completions to progress through the IOQ:
   an outbound ordering queue (OOQ) to store outbound transactions from an unordered protocol, wherein the unordered protocol is a Scalability Port, and completions of the inbound transactions, and to issue a write completion for a posted write;
   an OOQ read bypass buffer to receive read transactions pushed from the OOQ
   to permit the posted writes and the read/write completions to progress through the OOQ: and
   an unordered domain to receive the inbound transactions transmitted from the IOQ and to receive the outbound transactions transmitted from the unordered protocol.

4. An input/output hub, comprising:
   an ordered domain, including;
   an inbound ordering queue (IOQ) to receive and transmit inbound transactions, wherein inbound read and write transactions are not permitted to bypass inbound write data, all the read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;
   an IOQ read bypass buffer to receive read transactions pushed from the IOQ to permit posted writes and read/write completions to progress through the IOQ;
   an outbound ordering queue (OOQ) to store outbound transactions from an unordered protocol and completions of the inbound transactions, and to issue a write completion for a posted write;
   an OOQ read bypass buffer to receive read transactions pushed from the OOQ to permit the posted writes and the read/write completions to progress through the OOQ; and an unordered domain, in communication with an unordered protocol, including:
an inbound multiplexer to receive the inbound transactions from the ordered domain to the unordered protocol, and
an outbound demultiplexer to receive the outbound transactions from the unordered protocol to the ordered domain, wherein the unordered protocol is a coherent interface.

5. The input/output hub according to claim 4, further including at least one Producer-Consumer ordered interface in communication with the ordered domain.

6. The input/output hub according to claim 5, further including an input/output device connected with the Producer-Consumer ordered interface.

7. The input/output hub according to claim 6, coupled to an intermediary device that is external to the input/output hub, the intermediary device interconnecting the Producer-Consumer ordered interface and an input/output device.

8. The input/output hub according to claim 6, wherein the input/output device is a Peripheral Component Interconnect (PCI) device.

9. An input/output hub, comprising:
an ordered domain, including:
an inbound ordering queue (IOQ) to receive and transmit inbound transactions, wherein inbound read and write transactions are not permitted to bypass inbound write data, all the read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;
an IOQ read bypass buffer to receive read transactions pushed from the IOQ to permit posted writes and read/write completions to progress through the IOQ;
an outbound ordering queue (OOQ) to store outbound transactions from an unordered protocol and completions of the inbound transactions, and to issue a write completion for a posted write;
an OOQ read bypass buffer to receive read transactions pushed from the OOQ to permit the posted writes and the read/write completions to progress through the OOQ; and
an unordered domain, in communication with an unordered protocol, including:
an inbound multiplexer to receive the inbound transactions from the ordered domain to the unordered protocol, and
an outbound demultiplexer to receive the outbound transactions from the unordered protocol to the ordered domain, wherein the unordered protocol is a Scalability Port.

10. An input/output system, comprising:
an ordered domain, including:
an inbound ordering queue (IOQ) to receive and transmit inbound transactions, wherein inbound read and write transactions are not permitted to bypass inbound write data, all the read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;
an IOQ read bypass buffer to receive read transactions pushed from the IOQ to permit posted writes and read/write completions to progress through the IOQ;
an outbound ordering queue (OOQ) to store outbound transactions from an unordered protocol, wherein the unordered protocol is a coherent interface, and completions of the inbound transactions, and to issue a write completion for a posted write;
an OOQ read bypass buffer to receive read transactions pushed from the OOQ to permit the posted writes and the read/write completions to progress through the OOQ; and
an unordered domain, in communication with the unordered protocol, including:
an inbound multiplexer to receive the inbound transactions from the ordered domain to the unordered protocol;
an outbound demultiplexer to receive the outbound transactions from the unordered protocol to the ordered domain;
a Producer-Consumer ordered interface in communication with the ordered domain; and
an input/output device connected with the Producer-Consumer ordered interface.

11. The input/output system according to claim 10, wherein the input/output device is a Peripheral Component Interconnect (PCI) device.

12. The input/output system according to claim 10, coupled to an intermediary device external to the input/output system, the intermediary device interconnecting the Producer-Consumer ordered interface and the input/output device.

13. An input/output system, comprising:
an ordered domain, including:
an inbound ordering queue (IOQ) to receive and transmit inbound transactions, wherein inbound read and write transactions are not permitted to bypass inbound write data, all the read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;
an IOQ read bypass buffer to receive read transactions pushed from the IOQ to permit posted writes and read/write completions to progress through the IOQ:
an outbound ordering queue (OOQ) to store outbound transactions from an unordered protocol, wherein the unordered protocol is a Scalability Port, and completions of the inbound transactions, and to issue a write completion for a posted write;
an OOQ read bypass buffer to receive read transactions pushed from the OOQ to permit the posted writes and the read/write completions to progress through the OOQ; and
an unordered domain, in communication with the unordered protocol, including:
an inbound multiplexer to receive the inbound transactions from the ordered domain to the unordered protocol;
an outbound demultiplexer to receive the outbound transactions from the unordered protocol to the ordered domain;
a Producer-Consumer ordered interface in communication with the ordered domain; and an input/output device connected with the Producer-Consumer ordered interface.

14. An input/output system, comprising:

an ordered domain having a first functional block and a second functional block, wherein the first functional block and the second functional block each include:

an inbound ordering queue (IOQ) to receive inbound transactions, wherein inbound read and write transactions are not permitted to bypass inbound write data, all the read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;

an IOQ read bypass buffer to receive read transactions pushed from the IOQ to permit posted writes and read/write completions to progress through the IOQ;

an outbound ordering queue (OOQ) to store outbound transactions from an unordered protocol, wherein the unordered protocol is a coherent interface, and completions of the inbound transactions, and to issue a write completion for a posted write;

an OOQ read bypass buffer to receive read transactions pushed from the OOQ to permit the posted writes and the read/write completions to progress through the OOQ; and an unordered domain, in communication with the unordered protocol, including:

an inbound multiplexer to receive the inbound transactions from the ordered domain to the unordered protocol;

an outbound demultiplexer to receive the outbound transactions from the unordered protocol to the ordered domain;

a first Producer-Consumer ordered interface in communication with the first functional block;

a first input/output device connected with the first Producer-Consumer ordered interface;

a second Producer-Consumer ordered interface in communication with the second functional block; and a second input/output device connected with the second Producer-Consumer ordered interface.

15. The input/output system according to claim 14, wherein the first input/output device is a Peripheral Component Interconnect (PCI) device.

16. The input/output system according to claim 14, wherein the second input/output device is a Peripheral Component Interconnect (PCI) device.

17. The input/output system according to claim 14, coupled to a first intermediary device external to the input/output system, the intermediary device interconnecting the first Producer-Consumer ordered interface and the first input/output device.

18. The input/output system according to claim 14, coupled to a second intermediary device external to the input/output system interconnecting the second Producer-Consumer ordered interface and the second input/output device.

19. An input/output system, comprising:

an ordered domain having a first functional block and a second functional block, wherein the first functional block and the second functional block each include:

an inbound ordering queue (IOQ) to receive inbound transactions, wherein inbound read and write transactions are not permitted to bypass inbound write data, all the read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;

an IOQ read bypass buffer to receive read transactions pushed from the IOQ to permit posted writes and read/write completions to progress through the IOQ;

an outbound ordering queue (OOQ) to store outbound transactions from an unordered protocol, wherein the unordered protocol is a Scalability Port, and completions of the inbound transactions, and to issue a write completion for a posted write;

an OOQ read bypass buffer to receive read transactions pushed from the OOQ to permit the posted writes and the read/write completions to progress through the OOQ; and an unordered domain, in communication with the unordered protocol, including:

an inbound multiplexer to receive the inbound transactions from the ordered domain to the unordered protocol;

an outbound demultiplexer to receive the outbound transactions from the unordered protocol to the ordered domain;

a first Producer-Consumer ordered interface in communication with the first functional block;

a first input/output device connected with the first Producer-Consumer ordered interface;

a second Producer-Consumer ordered interface in communication with the second functional block; and a second input/output device connected with the second Producer-Consumer ordered interface.

20. A computer system, comprising:

a plurality of processor units having access to caches;

a main memory;

a coherent interface to maintain coherency between the processor units and their caches;

a scalability node controller interconnecting the processor units, the main memory, and the coherent interface to control interface therebetween; and an input/output hub in communication with the coherent interface, including:

an inbound ordering queue (IOQ) to receive inbound transactions, wherein all read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;

an IOQ read bypass buffer to receive read transactions pushed from the IOQ to permit posted writes and read/write completions to progress through the IOQ;

an outbound ordering queue (OOQ) to store outbound transactions from the coherent interface and completions of the inbound transactions, and to issue a write completion for a posted write;

an OOQ read bypass buffer to receive read transactions pushed from the OOQ to permit the posted writes and the read/write completions to progress through the OOQ; and an unordered domain to receive the inbound transactions transmitted from the IOQ and to receive the outbound transactions from the coherent interface.

21. The computer system according to claim 20, wherein the IOQ does not permit the inbound read and write transactions to bypass inbound write data.

22. A computer system, comprising:

a plurality of processor units having access to caches;

a main memory;

a Scalability Port to maintain coherency between the processor units and their caches;

a scalability node controller interconnecting the processor units, the main memory, and the Scalability Port to control interface therebetween; and an input/output hub in communication with the Scalability Port, including:

an inbound ordering queue (IOQ) to receive inbound transactions, wherein all read and write transactions have a transaction completion, peer-to-peer transactions are not permitted to reach a destination until after all prior writes in the IOQ have been completed, and a write in a peer-to-peer transaction does not permit subsequent accesses to proceed until the write is guaranteed to be in an ordered domain of the destination;

an IOQ read bypass buffer to receive read transactions pushed from the IOQ to permit posted writes and read/write completions to progress through the IOQ;

an outbound ordering queue (OOQ) to store outbound transactions from the Scalability Port and completions of the inbound transactions, and to issue a write completion for a posted write;

an OOQ read bypass buffer to receive read transactions pushed from the OOQ to permit the posted writes and the read/write completions to progress through the OOQ; and an unordered domain to receive the inbound transactions transmitted from the IOQ and to receive the outbound transactions from the Scalability Port.

* * * * *